United States Patent [19]
Qin et al.

[11] Patent Number: 5,680,409
[45] Date of Patent: Oct. 21, 1997

[54] METHOD AND APPARATUS FOR DETECTING AND IDENTIFYING FAULTY SENSORS IN A PROCESS

[75] Inventors: S. Joe Qin; Ricardo H. Dunia, both of Austin; Randall L. Hayes, Georgetown, all of Tex.

[73] Assignee: Fisher-Rosemount Systems, Inc., Austin, Tex.

[21] Appl. No.: 514,497

[22] Filed: Aug. 11, 1995

[51] Int. Cl.$^6$ .................................................. G06F 11/08
[52] U.S. Cl. .......................... 371/48; 371/26; 364/551.01; 364/571.02
[58] Field of Search ................... 371/48, 15.1, 37.9, 371/8.1, 25.1; 364/571.01, 57.02, 551.01, 581, 571.02–571.08, 554, 572–577; 382/41; 60/276

[56] References Cited

U.S. PATENT DOCUMENTS

| | | | |
|---|---|---|---|
| 4,249,238 | 2/1981 | Spang, III et al. | 364/106 |
| 4,926,364 | 5/1990 | Brotherton | 364/581 |
| 5,148,378 | 9/1992 | Shibayama et al. | 364/577.07 |
| 5,242,602 | 9/1993 | Richardson et al. | 210/745 |
| 5,283,729 | 2/1994 | Lloyd | 364/157 |
| 5,288,367 | 2/1994 | Angell et al. | 156/626 |
| 5,341,642 | 8/1994 | Kurihara et al. | 60/276 |
| 5,357,449 | 10/1994 | Oh | 364/551.01 |
| 5,377,305 | 12/1994 | Russo | 395/11 |
| 5,379,352 | 1/1995 | Sirat et al. | 382/41 |
| 5,386,373 | 1/1995 | Keeler et al. | 364/577 |
| 5,406,502 | 4/1995 | Haramaty et al. | 364/551.01 |
| 5,408,181 | 4/1995 | Dechene et al. | 324/307 |
| 5,420,508 | 5/1995 | Smith | 324/307 |
| 5,469,447 | 11/1995 | Brunemann et al | 371/36 |
| 5,548,597 | 8/1996 | Kayama et al. | 371/25.1 |

FOREIGN PATENT DOCUMENTS

| | | |
|---|---|---|
| 0 537 041 | 9/1992 | European Pat. Off. . |
| 44 36 658 | 4/1995 | Germany . |
| 59-005913 | 1/1984 | Japan . |
| 59-154320 | 9/1984 | Japan . |
| 06229791 | 8/1994 | Japan . |
| WO 93/21592 | 10/1993 | WIPO . |

OTHER PUBLICATIONS

Manus Henry, "Validating Data from Smart Sensors," *699 Control Engineering*, pp. 63–66 (Aug. 1994).

Dong et al., "Emission Monitoring Using Multivariate Soft Sensors," Draft copy of paper published in *Proceedings of Am. Control Conf.*, vol. 1, pp. 761–765 (1995).

Dong and McAvoy, "Nonlinear Principal Component Analysis Based on Principal Curves and Neural Networks," *Proceedings of Am. Control Conf.*, pp. 1284–1288 (Jun. 1994).

Dong and McAvoy, "Sensor Data Analysis Using Autoassociative Neural Nets," *Am. Control Conf.*, pp. 1–6 (1995).

Esbensen and Geladi, "Principal Component Analysis," pp. 209–224, reprinted from *Chemometrics and Intelligent Laboratory Systems*, pp. 37–52 (1987).

Fantoni and Mazzola, "Applications of Autoassociative Neural Networks for Signal Validation in Accident Management," published in *Proceedings of IAEA Specialists meeting on Advanced Information Methods and Artificial Intelligence in Nuclear Power Plant Control Rooms*, 11 pages (1994).

Geladi and Kowalski, "Partial Least-Squares Regression: A Tutorial," 185 *Analytica Chimica Acta* pp. 1–17 (1986).

Jackson, "Principal Components and Factor Analysis: Part I—Principal Components," *J. Quality Technology*, vol. 12, No. 4, pp. 201–213 (Oct. 1980).

Jackson, A User's Guide to Principal Components, Chapters 1–2, pp. 4–55 (1991).

Kramer, "Autoassociative Neural Networks," *16 Computers & Chem. Engineering* (No. 4) pp. 313–328 (1992).

Kramer, "Nonlinear Principal Component Analysis Using Autoassociative Neural Networks," *AIChE Journal*, vol. 37 (No. 2) pp. 233–243 (1991).

Lucas and Saccucci, "Exponentially Weighted Moving Average Control Schemes: Properties and Enhancements," *Technometrics*, vol. 32 (No. 1) pp. 1–12 (Feb. 1990).

MacGregor, "Statistical Process Control of Multivariate Processes," *IFAC, ADCHEM preprint*, 11 pages (1994).

McBrayer, "Description of Bias Identification Method Used With NDDR," *Technical Report, University of Texas at Austin*, pp. 1–13 (1995).

Wise and Ricker, "Recent Advances in Multivariate Statistical Process Control Improving Robustness and Sensitivity," *IFAC Int'l Symposium* ADCHEM '91, pp. 125–130 (1991).

Tong and Crowe, "Detection of Gross Errors in Data Reconciliation by Principal Component Analysis," *AIChE Journal*, vol. 41 (No. 7) pp. 1712–1722 (Jul. 1995).

*Primary Examiner*—Robert W. Beausoliel, Jr.
*Assistant Examiner*—Nadeem Iqbal
*Attorney, Agent, or Firm*—Marshall, O'Toole, Gerstein, Murray & Borun

[57] ABSTRACT

A method and apparatus is provided for detecting a faulty sensor within a process control system having a set of sensors, each of which produces an associated sensor output signal. The method and apparatus produce a set of sensor estimate signals from the sensor output signals using principal component analysis and then determine a validity index for each of the sensors as a ratio of two residuals, wherein each of the residuals represents a different measure of the difference between the sensor output signals and the sensor estimate signals. The determined validity indexes are then used to detect a failure of one of the sensors and/or to identify which one of the sensors has failed.

40 Claims, 7 Drawing Sheets

METHOD AND APPARATUS FOR DETECTING AND IDENTIFYING FAULTY SENSORS IN A PROCESS

TECHNICAL FIELD

The present invention relates generally to process controllers which include a set of sensors for measuring process parameters within a process and more particularly to process controllers that detect and identify a failure of one or more of the sensors associated therewith.

BACKGROUND ART

Typically, process control systems include a set of sensors which measure different process parameters during operation of a process and a process controller which controls the process based on the sensed parameters. Although there are numerous known methods of controlling a process in response to the measurements of such a set of sensors, a peculiar problem of controlling a process occurs when one or more of the sensors fails, giving rise to false or inaccurate sensor measurements. If the failed sensor develops grossly incorrect values and/or the failure of the sensor is not detected within a short period of time, the process controller may control the process in a way which is undesirable and/or detrimental.

Although failure of a sensor can occur in any number of ways, sensor failures can generally be summarized as falling within one of four categories including sensor bias faults, sensor drift faults, sensor precision degradation faults, and complete sensor failures.

The different types of faults which may occur within a sensor are illustrated in FIGS. 1a–1d, in which the open dots represent the true and actual values of the process parameter which is being measured and the solid dots represent the outputs of the faulty sensor. FIG. 1a illustrates a sensor bias fault wherein the sensor adds a constant bias value to the actual process parameter. FIG. 1b illustrates a complete failure of the sensor wherein the output of the sensor is constant or is corrupted in a manner unrelated to the actual value of the process parameter. FIG. 1c illustrates a sensor drift fault wherein the sensor output represents an autocorrelated term with a constant forcing function added to the actual value of the process parameter. FIG. 1d illustrates a sensor precision degradation fault wherein the sensor output represents the actual value of the process parameter added to a random noise term.

Controllers which determine when a sensor within a process control system has failed in one of the above-identified manners and which notify an operator of such a failure are known. One prior art method of determining when a process sensor has failed uses known mathematical routines to calculate a sensor estimate signal for each of a set of sensors associated with a process control system from actual sensor output signals developed by the sensors. This method then determines if the error between the sensor estimate signals and the sensor output signals is greater than a predetermined threshold. If the error is greater than the predetermined threshold, the method detects that one of the sensors of the process control system has failed.

A prior art mathematical routine which has been used in developing a set of sensor estimate signals is principal component analysis (PCA). PCA is a transformation technique that converts a set of correlated variables, such as a set of correlated sensor measurements, into a smaller set of uncorrelated variables. The effect of this transformation technique is to rotate the coordinate system of, for example, the set of sensor measurements, in a way that results in the alignment of information represented by the sensor measurements on a fewer number of axes than in the original coordinate system. This transformation results in a compression of the variables by allowing those variables that are highly correlated with one another to be treated as a single variable. After PCA has been performed for a process, a set of m uncorrelated variables or principal components, generally referred to as $t_1, t_2 \ldots t_m$, represent most of the information that was in the original set of variables. PCA is generally described in Geladi, Kowalski, "Partial Least-Squares Regression: A Tutorial" 185 Analytica Chimica Acta 1 (1986), the disclosure of which is hereby incorporated by reference herein.

Importantly, in determining the principal components $t_1, t_2 \ldots t_m$ for a particular process having n sensors, a set of principal component weighting coefficients $p_{ij}$ (wherein i ranges from 1 to the number of principle components m and j ranges from 1 to the number of sensors n) is determined such that multiplication of the principal components with the appropriate principal component weighting coefficients provides a set of sensor estimate signals $\hat{x}_1, \hat{x}_2 \ldots \hat{x}_n$ which approximately equal the sensor output signals $x_1, x_2 \ldots x_n$ measured by the sensors $S_1, S_2 \ldots S_n$, respectively. In general:

$$\hat{x}_j = \sum_{i=1}^{m} t_i p_{ij} = x_j \qquad (1)$$

wherein: $x_j$=the sensor output signal of the jth sensor;

$\hat{x}_j$=the sensor estimate signal associated with the jth sensor;

$t_i$=the ith principal component;

$p_{ij}$=the principal component weighting coefficient associated with the ith principal component and the jth sensor wherein i ranges from to 1 to m and j ranges from 1 to n;

m=the number of principal components associated with the system; and the number of sensors of the system.

Equation (1) can be expressed in vector form as:

$$\hat{x} = tP^T = xPP^T \qquad (2)$$

wherein: $\hat{x}$=a row vector of length n comprising the n sensor estimate signals;

t=a row vector of length m comprising the m principal components;

p=a matrix of length n comprising n sets of m principal component weighting coefficients; and x=a row vector of length n comprising the n sensor output signals.

$^T$ indicates the transpose of the associated matrix.

Once the principal component weighting coefficients $p_{ij}$ for all i=1 to m and j=1 to n have been determined for a particular process, these principal component weighting coefficients can be used to develop the sensor estimate signals $\hat{x}_1, \hat{x}_2 \ldots \hat{x}_n$ at any particular time period of the process according to known PCA techniques. More specifically, the sensor estimate signals can be determined according to equations (1) or (2), wherein the principal components $t_1$-$t_m$ are calculated for that time period from the principal component weighting coefficients $P_{ij}$ and the sensor output signals $x_1$-$x_n$.

The method of defining the principal component weighting coefficients to be used for any particular system having a number of sensors is known in the prior art and is generally described in Geladi, Kowalski, "Partial Least-Squares Regression: A Tutorial," 185 Analytica Chimica Acta 1 (1986) and in Wise, Ricker, "Recent Advances in Multivariate Statistical Process Control: Improving Robustness and Sensitivity," IFAC International Symposium, ADCHEM '91, Toulouse France, pp. 125-130 (1991) and the references cited therein. Generally, methods which measure the material composition and polymer properties of a substance using principal component analyses are described in Smith, U.S. Pat. No. 5,420,508 and Dechene et al., U.S. Pat. No. 5,408,181. Methods of extracting principal components and processing signal data using a principal component transform are described in Russo, U.S. Pat. No. 5,377,305 and Sirat et al., U.S. Pat. No. 5,379,352. Haramaty et al., U.S. Pat. No. 5,406,502 describes a system for measuring the operability of a device which uses principal component analysis to define a multi-dimensional virtual sensor space that indicates normal operation of the device.

FIG. 2 graphically illustrates a principle component analysis transformation routine for use in a process having five sensors $S_1$–$S_5$. The routine uses two principle components $t_1$ and $t_2$ and transforms the sensor output signals $x_1$, $x_2$ ... $x_5$ developed by the sensors $S_1$–$S_5$ into sensor estimate signals $\hat{x}_1$, $\hat{x}_2$ ... $\hat{x}_5$. As illustrated in FIG. 2, the sensor output signals $x_1$, $x_2$ ... $x_5$ are multiplied by a predetermined set of principal component weighing coefficients $p_{ij}$ to develop the two principal components $t_1$ and $t_2$. The principal components $t_1$ and $t_2$ are then multiplied by the set of principal component weighting coefficients $p_{ij}$ (wherein i ranges from 1 to 2 and j ranges from 1 to 5) to develop the sensor estimate signals $\hat{x}_1$, $\hat{x}_2$ ... $\hat{x}_5$. Under normal conditions, i.e., when the sensors $S_1$–$S_5$ are all working properly, the sensor estimate signals $\hat{x}_1$–$\hat{x}_5$ will be approximately equal to the sensor output signals $x_1$–$x_5$.

As noted above, prior art systems typically detect that one of the sensors $S_1$–$S_n$ of a process control system has failed by calculating an error signal e defined as the sum of the squared errors between the sensor estimate signals $\hat{x}_1$-$\hat{x}_n$ and the sensor output signals $x_1$-$x_n$. More particularly, the error signal is usually determined as:

$$e = \sum_{i=1}^{n} (x_i - \hat{x}_i)^2 \quad (3)$$

When the error signal e reaches a predetermined value in these prior art systems, the systems indicate that one of the sensors $S_1$–$S_n$ has failed. Typically, these prior art systems estimate which sensor has failed simply by determining the difference between each sensor output signal, sensor estimate signal pair $x_i$, $\hat{x}_i$ and by identifying the sensor associated with the pair that has the greatest associated difference as the failed sensor. This method of identifying failed sensors is not very accurate or reliable, however, due to the fact that normal (non-faulty) sensors can, at any particular time, also have large errors which may lead to false identification of a failed sensor using such a straightforward comparison.

SUMMARY OF THE INVENTION

The present invention provides a process controller capable of quickly and accurately detecting failures of one or more sensors and of identifying which of the sensors has failed in a reliable manner. Specifically, the present invention provides a method and apparatus which performs a correlation analysis such as principal component analysis on a set of sensor output signals to determine a set of sensor estimate signals and which determines a sensor validity index for each of the sensors based on one or more residuals determined as a function of the difference between the sensor estimate signals and the sensor output signals. The sensor validity indexes are used to determine which one of the sensors has failed.

According to one aspect of the invention, a method and apparatus is provided for detecting a faulty sensor within a process control system having a set of sensors, each of which produces an associated sensor output signal. The method and apparatus produce a set of sensor estimate signals from the sensor output signals using, for example, a principal component analysis, and determine a validity index for each of a plurality of the sensors from the sensor estimate signals. The method and apparatus then use the validity index associated with one of the sensors to ascertain if the one of the sensors has failed. If desired, the validity indexes may be filtered interactively and/or adaptively.

Preferably, the validity index associated with any one of the sensors is determined as a function of two residuals, each of which indicates a difference between the sensor estimate signals and the sensor output signals. One of the residuals may be calculated in a manner which is independent of the particular sensor for which the validity index is being determined, for example, the sum of the squared differences between the sensor estimate signals and the sensor output signals. The other of the residuals, however, is determined as a function of the particular sensor for which the validity index is being determined and, in one embodiment, is a function of the cross-correlation matrix associated with the weighting coefficients used by the principal component analysis to determine the sensor estimate signals. Most preferably, the validity index for a particular sensor is determined as the ratio of the two residuals.

According to another aspect of the invention, a method and apparatus for identifying a faulty sensor in a process having multiple sensors, each of which produces an associated sensor output signal, uses a correlation analysis to determine a set of sensor estimate signals from the sensor output signals and calculates one or more residuals indicative of the error between the sensor output signals and the sensor estimate signals. The method and apparatus determine if one of the sensors has failed from the one or more residuals and calculates a validity index for each of the sensors as a function of the residuals when one of the sensors has been determined to have failed. The particular sensor which has failed is identified from the calculated validity indexes. An operator may be notified of the identity of the failed sensor.

The process control system may be operated to control the process in accordance with the sensor estimate signal associated with the failed sensor instead of the output signal developed by the failed sensor when a failed sensor is detected and identified.

The method of the present invention, which calculates of a set of validity indexes as a function of the ratio of two residuals, is more reliable in identifying the particular sensor which has failed than prior art methods because the validity indexes of the present method are less susceptible to any noise which may be present in the sensor output signals and in the sensor estimate signals than the criteria used by prior art methods to identify faulty sensors. Also, calculating each of a set of validity indexes as the ratio of two residuals, as performed by the present invention, amplifies the differences between different validity indexes, i.e., when one of the set of validity indexes goes down, the others go up. As a result, it is easier to detect which particular sensor has failed using the validity indexes of the present invention than using prior art methods which use faulty sensor identification indexes that are not related to one another.

DETAILED DESCRIPTION

Figure 1A:
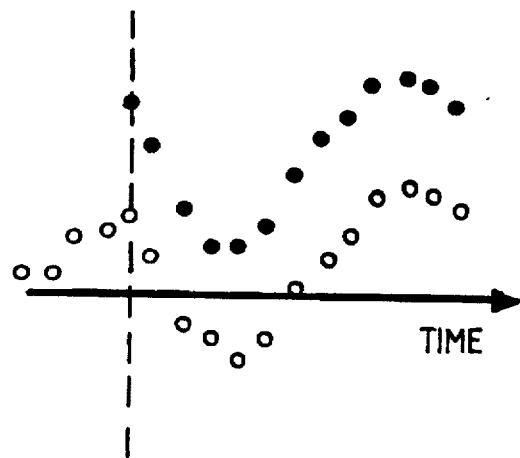
FIGS. 1a–1d comprise graphs representing the types of sensor faults which typically occur in a sensor.
Figure 1B:
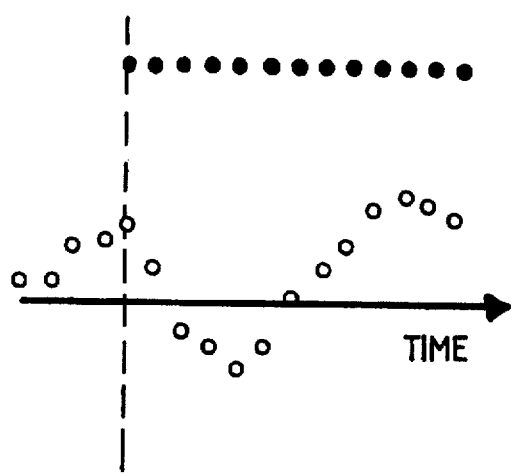
Figure 1C:
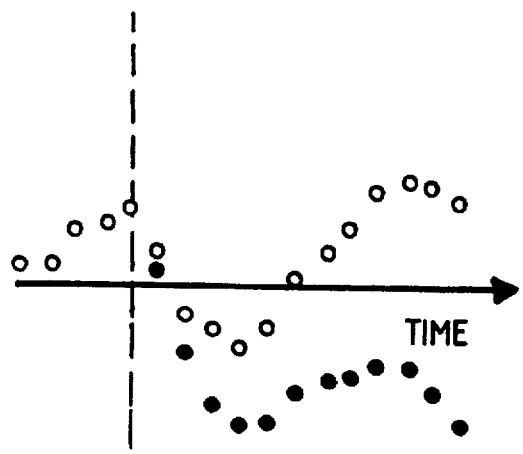
Figure 1D:
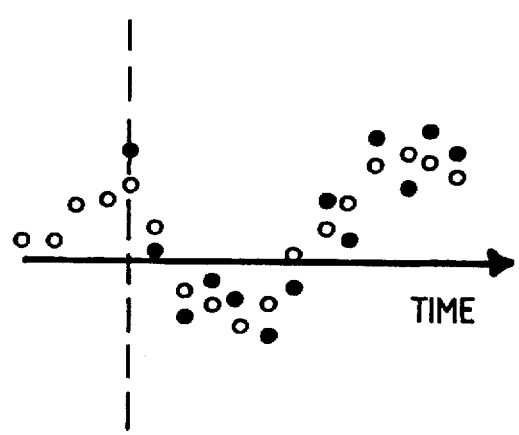
Figure 2:
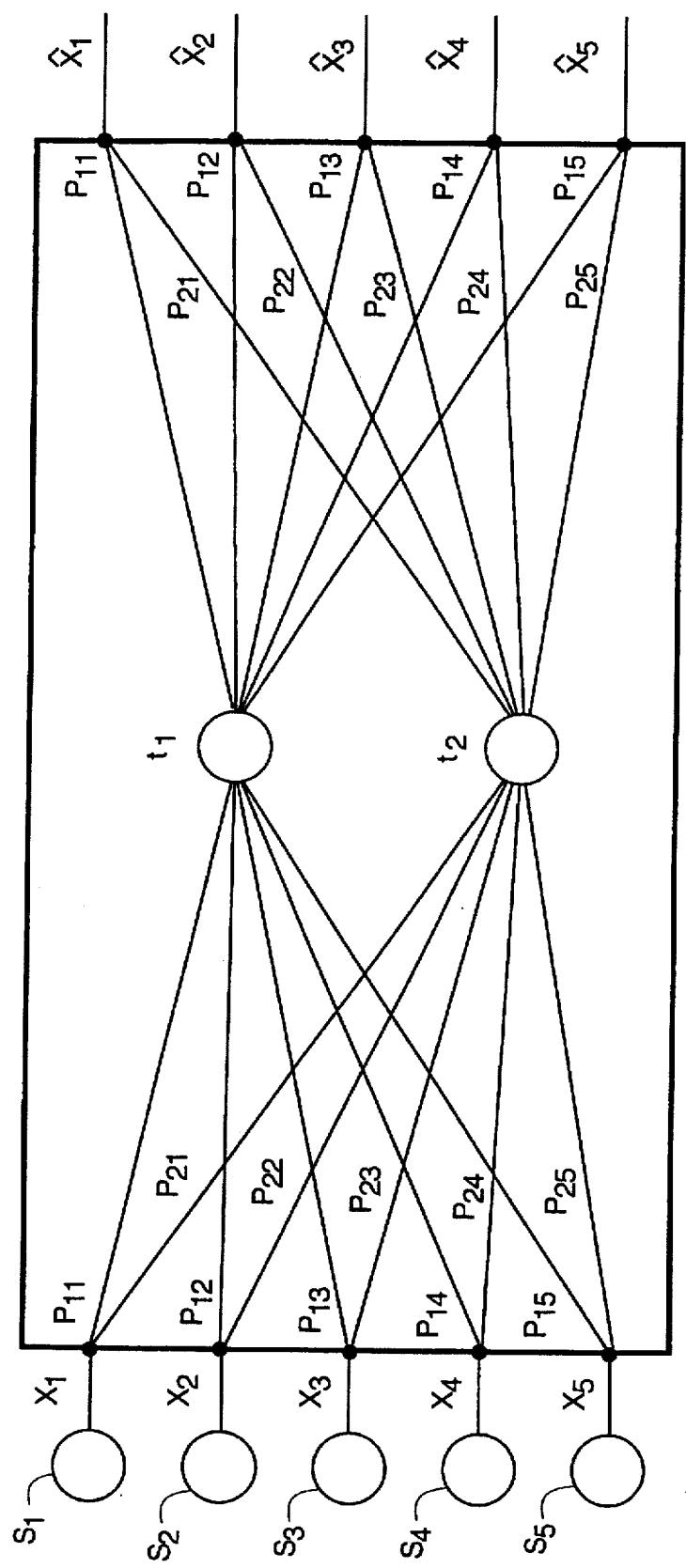
FIG. 2 comprises a graphic illustration of the method by which sensor estimate signals are developed from sensor output signals according to a principal component analysis routine.
Figure 3:
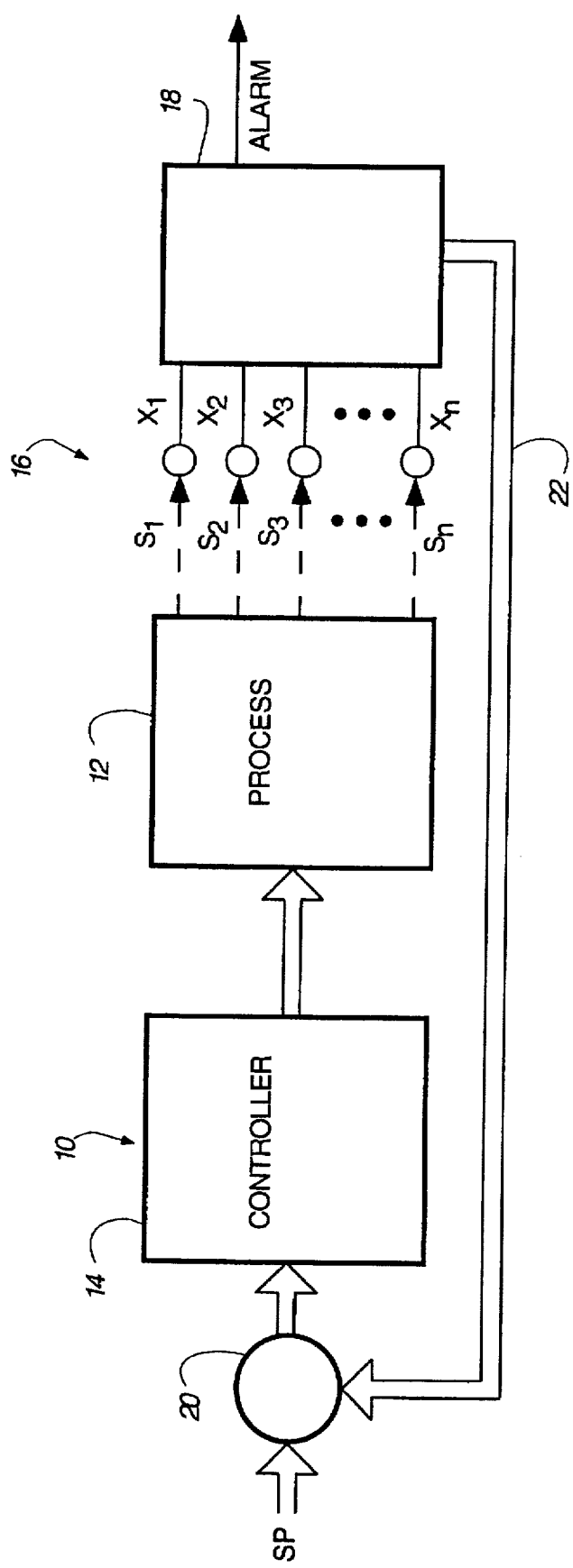
FIG. 3 comprises a block diagram illustrating a process controller which includes an apparatus for detecting and identifying faulty sensors in accordance with the present invention.

Referring to FIG. 3, a process control system 10 is adapted for controlling a process 12. As is typical in process control systems, a controller 14 controls the process 12 according to signals produced by a feedback loop comprising a set of sensors 16, a faulty sensor identifier and reconstruction block 18 and a summing network 20. The set of sensors 16 may comprise any number of discrete sensors $S_1, S_2 \ldots S_n$ (wherein n is the total number of sensors), each of which measures one or more process parameters, such as temperature and/or pressure. The sensors $S_1, S_2 \ldots S_n$ develop sensor output signals $x_1, x_2 \ldots x_n$, respectively, indicative of the measured process parameters, and deliver these output signals to the block 18. If desired, the set of sensors 16 may include redundant sensors, i.e., two or more sensors which measure the same or related process parameters in the same or different locations of the process 12.

The faulty sensor and reconstruction block 18 analyzes the sensor output signals $x_1$-$x_n$ and calculates a set of sensor estimate signals $\hat{x}_1, \hat{x}_2 \ldots \hat{x}_n$ associated with the sensors $S_1, S_2 \ldots S_n$, respectively. The block 18 then detects if one of the sensors has failed and, if so, identifies which of the sensors $S_1$-$S_n$ has failed using the sensor estimate signals $S_1$-$S_n$. If the block 18 determines that none of the sensors $S_1$-$S_n$ has failed, the block 18 delivers signals indicative of the sensor output signals $x_1$-$x_n$ to the summing network 20 via a bus 22. The summing network 20 compares the signals indicative of the sensor output signals $x_1$-$x_n$ to one or more set point values to determine a set of error signals which, in turn, are delivered to the process controller 14 for use in controlling the process 12.

If the block 18 detects a failure of one of the sensors $S_1$-$S_n$, the block 18 identifies which sensor has failed, referred to hereinafter as the failed or faulty sensor $S_f$, and replaces the sensor output signal $x_f$ produced by the failed sensor $S_f$ with the sensor estimate signal $\hat{x}_f$ calculated for the failed sensor $S_f$ before sending the sensor output signals to the summing network 20. Simultaneously, the block 18 alerts a user or operator of the faulty sensor $S_f$ by sending appropriate alarms or messages to a computer terminal or a control board or by using any other desired method of indicating the presence of a faulty sensor to the operator, so that the operator can repair or replace the faulty sensor $S_f$. In this manner, the block 20 alerts an operator to the presence of a faulty sensor while, simultaneously, preventing the controller 14 from controlling the process 12 based on faulty sensor measurements.

As a result of this replacement technique, the process controller 14 controls the process 12, in the presence of a faulty sensor, in accordance with an estimate of the value of the parameter being measured by the faulty sensor $S_f$ instead of the faulty sensor output signal $x_f$ which may bear little or no relation to the actual value of the process parameter being measured. This control method enables more accurate control of the process 12 when one of the sensors has failed, which may be critical in certain process control systems such as nuclear process control systems.

The process 12 may be any type of process while the process controller 14 may be any type of controller such as a proportional-integral (PI) controller, a proportion-integral-derivative (PID) controller, any type of fuzzy logic controller or any other desired type of controller which produces one or more control signals for controlling the process 12. The process control system 10 may also include a tuner (not shown) which retunes the controller 14 during operation of the process 12 in response to one or more outputs of the process 12 as measured by the sensors $S_1$-$S_n$. Controllers and/or tuners which may be used are described in U.S. Pat. No. 5,283,729, the disclosure of which is hereby incorporated herein by reference, in U.S. patent application, Ser. No. 08/105,899, entitled "Method and Apparatus for Fuzzy Logic Control with Automatic Tuning," filed Aug. 11, 1993, in U.S. patent application Ser. No. 08/070,090, entitled "System and Method for Automatically Tuning a Process Controller," filed May 28, 1993, and/or in U.S. patent application Ser. No. 08/391,717, entitled "Method of Adapting and Applying Control Parameters in Non-linear Process Controllers," filed Feb. 21, 1995, all of which are assigned to the assignee of the present invention, and the disclosure of each of which is hereby incorporated herein by reference.

Figure 4:
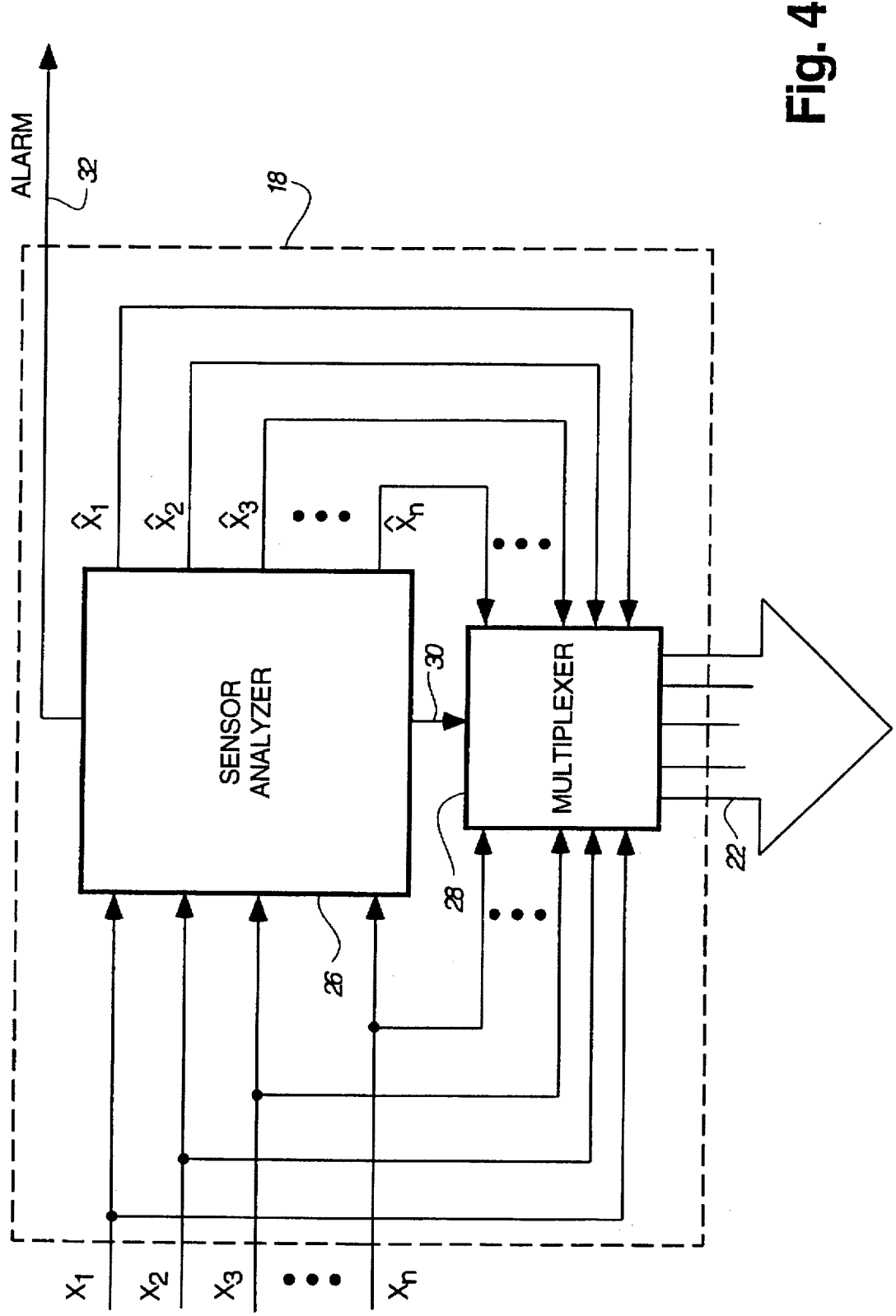
FIG. 4 comprises a block diagram illustrating the faulty sensor identifier and reconstruction block of FIG. 3.

Referring now to FIG. 4, the sensor fault identifier and reconstruction block 18 is illustrated in greater detail. The block 18, which may be implemented using a microprocessor or any other desired type of computer, includes a sensor analyzer 26 and a multiplexer 28 coupled to the sensor analyzer 26 via a control line 30. The sensor analyzer 26, which may comprise a suitably programmed digital or analog computer, a microprocessor or any other desired processing machine, is responsive to the sensor output signals $x_1$-$x_n$ and develops a set of sensor estimate signals $\hat{x}_1$-$\hat{x}_n$ associated with the sensors $S_1$-$S_n$, respectively. The sensor output signals $x_1$-$x_n$ and the sensor estimate signals $\hat{x}_1$-$\hat{x}_n$ are delivered to the multiplexer 28 as illustrated in FIG. 4.

When the sensor analyzer 26 determines that none of the sensors $S_1$-$S_n$ has failed, the multiplexer 28 delivers the sensor output signals $x_1$-$x_n$ directly to the summing network 20 of FIG. 3 via the bus 22. However, when the sensor analyzer 26 determines that one or more of the sensors $S_1$-$S_n$ has failed, the sensor analyzer 26 sends an alarm signal or other signal indicating that an error has occurred to an operator via a signal line 32. The sensor analyzer 26 also determines which particular sensor has failed and, upon doing so, controls the multiplexer 28, via the control line 30, to provide the sensor estimate signal $\hat{x}_f$ associated with the failed sensor $S_f$ to the summing network 20 (of FIG. 3) instead of the sensor output signal $x_f$ developed by the failed sensor $S_f$. The sensor analyzer 26 also sends a signal indicative of the failed sensor or sensors to an operator via the signal line 32. In this manner, the sensor analyzer 26, in combination with the multiplexer 28, forwards the sensor output signals $x_1$-$x_n$ to the summing network 20 for use in controlling the process 12 when the sensors $S_1$-$S_n$ are operating properly and forwards the sensor output signals associated with the non-faulty sensors along with the sensor estimate signal $\hat{x}_f$ associated with the failed sensor $S_f$ to the summing network 20 for use in controlling the process 12 when the sensor $S_f$ has failed.

Generally, the sensor analyzer 26 of FIG. 4 performs a correlation analysis such as a principal component analysis (PCA) on the sensor output signals $x_1$-$x_n$ (1) to detect whether one or more of the sensors $S_1$-$S_n$ has failed, (2) to identify which one or ones of the sensors $S_1$-$S_n$ has failed and (3) to develop a sensor estimate signal $\hat{x}_f$ for each failed sensor to be used to replace the sensor output signal of the failed sensor in controlling the process 12. Although the invention is described in conjunction with PCA, any other desired correlation analysis including multiple linear regression analysis, principal component regression analysis and partial least-squares regression analysis, all of which are known in the art and which are described in more detail in Geladi, Kowalski, "Partial Least-Squares Regression: A Tutorial," 185 Analytica Chimica Acta 1 (1986), can be used instead.

Generally, the method of detecting and identifying a failed sensor according to the present invention implements or simulates an iterative routine which calculates sensor estimate signals $\hat{x}_1$-$\hat{x}_n$ for the sensors $S_1$-$S_n$, respectively. In this iterative routine, a sensor estimate signal $\hat{x}_i$ for a sensor $S_i$ is recalculated during each of a number iterations using the PCA technique defined by equations (1) and (2), wherein, in each iteration, the sensor output signal $x_i$ is replaced with the sensor estimate signal $\hat{x}_i$ calculated in the previous iteration. The iterations of the routine are, in theory, repeated until the sensor estimate signal $\hat{x}_i$ reaches an asymptotic value.

When all of the sensor estimates signals $\hat{x}_1$-$\hat{x}_n$ have been calculated, the method of detecting and identifying a failed sensor calculates one or more residuals which measure the error between the sensor output signals $x_1$-$x_n$ and the calculated sensor estimate signals $\hat{x}_1$-$\hat{x}_n$ and then calculates a sensor validity index for each sensor as a function of the one or more residuals. The method detects if a sensor has failed from the residual or from the sensor validity indexes and identifies which sensor has failed from the sensor validity indexes. Upon detecting and identifying a faulty sensor, the method replaces the sensor output signal of the failed sensor with the sensor estimate signal calculated for the failed sensor.

Figure 5:
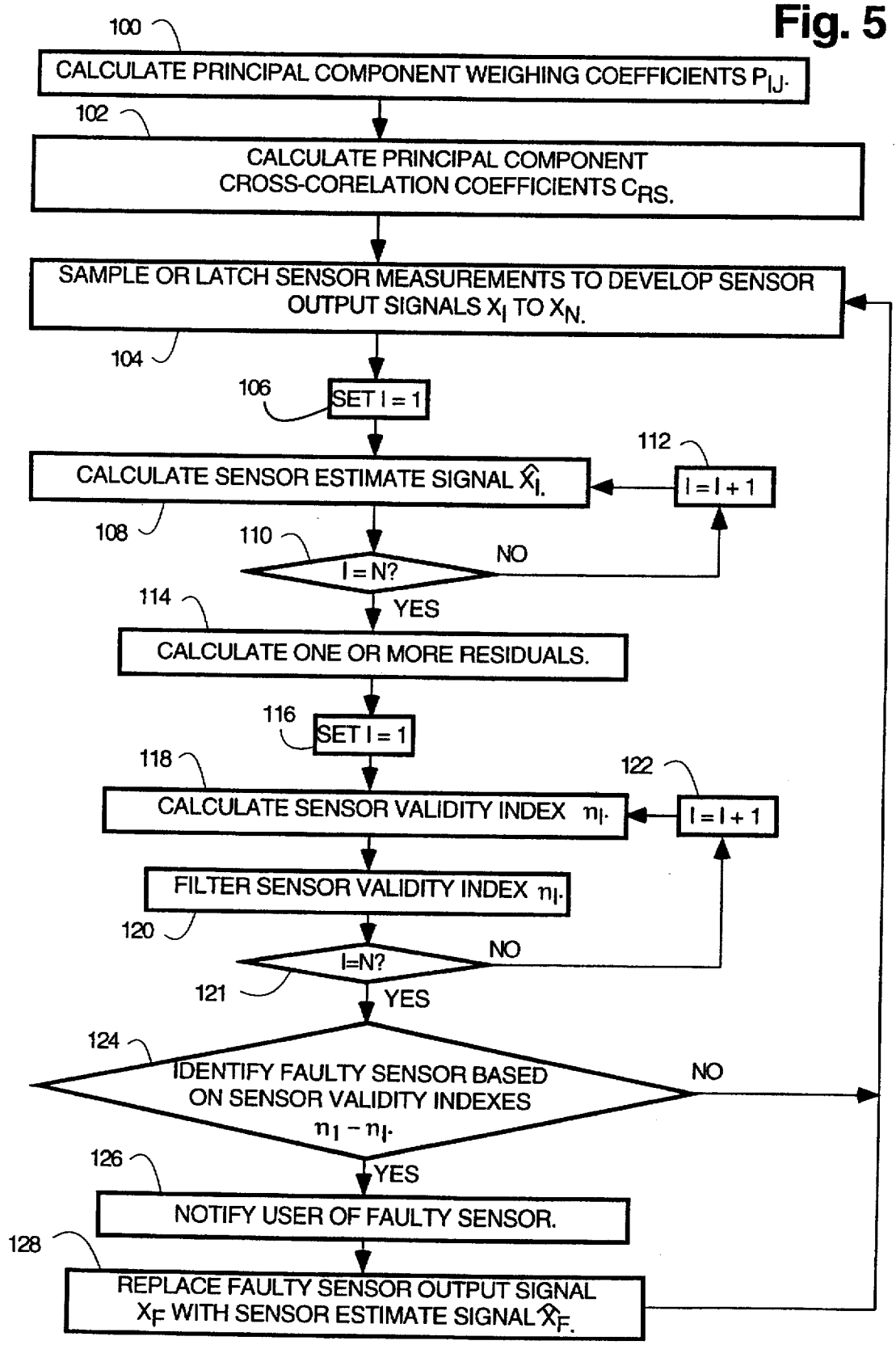
FIG. 5 comprises a flow chart illustrating a method of detecting and identifying faulty sensors in accordance with the present invention.

The flow chart of FIG. 5 illustrates a method of detecting and identifying faulty sensors according to the present invention which can be implemented by the sensor analyzer 26 of FIG. 4. According to the method of FIG. 5, a block 100 first determines the principal component weighting coefficients $p_{ij}$ (wherein i ranges from 1 to the number of principal components m and j ranges from 1 to the number of sensors n) for the process 12 having parameters measured by the sensors $S_1, S_2 \ldots S_n$.

A block 102 then calculates a set of principle component cross-correlation coefficients $c_{rs}$ (wherein r and s range from 1 to n) as:

$$c_{rs} = \sum_{j=1}^{m} \sum_{i=1}^{m} p_{jr} p_{is} \qquad (4)$$

wherein: $c_{rs}$ = one of the $n^2$ cross-correlation coefficients developed from the principal component weighting coefficients;

$p_{jr}$ = the principal component weighting coefficient associated with the jth principal component and the rth sensor; and $p_{is}$ = the principal component weighting coefficient associated with the ith principal component and the sth sensor.

Equation (4) can be expressed in matrix form as:

$$C = PP^T \qquad (5)$$

wherein: C = an n by n matrix comprising the cross-correlation coefficients $c_{rs}$ for all r=1 to n and s=1 to n; and p = a row matrix of length n comprising n sets of m principal component weighting coefficients.

The cross-correlation coefficient matrix C of equation (5) can be expressed as a set of n column matrices as:

$$C = [C_1 C_2 \ldots C_n] \qquad (6)$$

wherein each of the column matrices $C_i$ includes the cross-correlation coefficients $c_{rs}$ as follows:

$$c_i = \begin{bmatrix} c_{i1} \\ c_{i2} \\ c_{i3} \\ \cdot \\ \cdot \\ \cdot \\ c_{in} \end{bmatrix} \qquad (7)$$

The calculations performed by the blocks 100 and 102 can be performed at any time before or during the running of the process 12 and, if desired, the set of cross-correlation coefficients $c_{rs}$ for all values of r and s, i.e., the C matrix, can be stored in a memory (not shown) associated with the sensor analyzer 26 for use in developing the sensor estimate signals $\hat{x}_1$-$\hat{x}_n$.

As indicated above, during operation of the process 12, each of the set of sensors 16 illustrated in FIG. 3 delivers a sensor output, indicative of a measured process parameter, to the sensor analyzer 26 in either a periodic or continuous manner. A block 104 samples or latches these sensor measurements to develop the sensor output signals $x_1$-$x_n$.

Blocks 106–112 then calculate a sensor estimate signal $\hat{x}_i$ for each of the sensors $S_1$-$S_n$. The block 106 sets the variable i equal to one (indicating that the sensor estimate signal $\hat{x}_1$ for the first sensor $S_1$ is to be calculated) and a block 108 calculates the sensor estimate signal $\hat{x}_i$ for the sensor $S_i$ as:

$$\hat{x}_i = \frac{\sum_{s=1}^{i-1} c_{is} x_s + \sum_{s=i+1}^{n} c_{is} x_s}{1 - c_{ii}} \qquad (8)$$

wherein: $\hat{x}_i$ = the sensor estimate signal associated with the ith sensor;

$x_s$ = the sensor output signal of the sth sensor; and $c_{is}$ & $c_{ii}$ = the cross-correlation coefficient identified by the subscripts i and s.

Equation (8) can also be expressed as:

$$\hat{x}_i = \frac{[X_{i-} \; 0 \; X_{i+}] c_i}{1 - c_{ii}} \qquad (9)$$

wherein: $X_{i-}$ = a row matrix of length i-1 comprising the first i-1 sensor output signals;

0 = a zero matrix element;

$X_{i+}$ = a row matrix of length n-i comprising the last n-i sensor output signals; and $C_i$ = the ith column matrix of the matrix C of equation (6).

The equations (8) and (9) determine the asymptotic value of $\hat{x}_i$ developed by the above-described iterative routine without actually performing any iterations. The iterative calculations could, however, be performed using:

$$\hat{x}_i^{new} = c_{ii}\hat{x}_i^{old} + [X_{i-} 0 \ X_{i+}]c_i = c_{ii}\hat{x}_i^{old} + \sum_{s=1}^{i-1} c_{is}x_s + \sum_{s=i+1}^{n} c_{is}x_s \quad (10)$$

wherein: $\hat{x}_i^{new}$=the sensor estimate signal associated with the ith sensor for the current iteration; and $\hat{x}_i^{old}$=the sensor estimate signal associated with the ith sensor for the previous iteration.

Next, a block 110 tests to see if a sensor estimate signal has been determined for every sensor, i.e., if the variable i equals the number of sensors n. If not, a block 112 increments the variable i by one and returns control to the block 108. Otherwise, sensor estimate signals have been calculated for each of the sensors $S_1$-$S_n$ and control passes to a block 114.

The block 114 may calculate one or more residuals associated with the calculated set of sensor estimate signals $\hat{x}_1$-$\hat{x}_n$ and the sensor output signals $x_1$-$x_5$. A residual is a measure of the difference between a set of sensor estimate signals and a set of actual sensor output signals and can be calculated in any known or desired manner. One or more of the residuals may be used by the block 114 to determine if a fault has occurred in one of the sensors and/or may be used to determine which particular sensor has failed.

Preferably, the block 114 calculates a residual A as the sum of the squared differences between the sensor output signals and the calculated sensor estimate signals. More particularly, the block 114 determines the residual A as:

$$A = \sum_{i=1}^{n} (x_i - \hat{x}_i)^2 \quad (11)$$

Alternatively, or in addition, the block 114 can calculate other residuals $B_i$, $C_i$, $D_i$ and $E_i$ for any particular sensor $S_i$ wherein:

$$B_i = A + \frac{(\hat{x}_i - x_i)^2}{(1 - c_{ii})^2} c_{ii} \quad (12)$$

$$C_i = A + \frac{(\hat{x}_i - x_i)^2 (2c_{ii} - 1)}{(1 - c_{ii})^2} \quad (13)$$

$$D_i = \frac{(\hat{x}_i - x_i)^2}{(1 - c_{ii})^2} \quad (14)$$

and $$E_i = A - \frac{(\hat{x}_i - x_i)^2}{1 - c_{ii}} \quad (15)$$

Generally, the residual $B_i$ comprises an indication of the difference between the sensor output signals and the sensor estimate signals developed by replacing the sensor output signal $x_i$ with the sensor estimate signal $\hat{x}_i$. The residual $C_i$ comprises an indication of the difference between the sensor output signals having the sensor output signal $x_i$ replaced by the sensor estimate signal $\hat{x}_i$ and the sensor estimate signals. The residual $D_i$ comprises an indication of the difference between the sensor output signals and the sensor output signals having the sensor output signal $x_i$ replaced by the sensor estimate signal $\hat{x}_i$. The residual $E_i$ indicates the difference between the sensor output signals having the sensor output signal $x_i$ replaced by the sensor estimate signal $\hat{x}_i$ and the sensor estimate signals developed by replacing the sensor output signal $x_i$ with the sensor estimate signal $\hat{x}_i$. The block 114 can calculate any other desired residuals which indicate a difference between the sensor output signals and the sensor estimate signals in a consistent and quantifiable manner.

Once the desired residual or residuals are calculated, the block 114 can compare a residual to a predetermined value to determine if one of the sensors has failed. If the residual is greater than the predetermined value or if the residual meets some other desired predetermined criteria, for example, the mean of the residual over a number of time periods is greater than a predetermined value, the block 114 detects that one of the sensors has failed.

Alternatively or in addition to the calculations of the block 114, blocks 116–122 calculate a sensor validity index $\eta$ for each of the sensors $S_1$-$S_n$. In effect, the sensor validity index $\eta_i$ for a sensor $S_i$ indicates the validity of the sensor $S_i$. Generally, each sensor validity index is calculated as a function of any two or more residuals and, more preferably, is calculated as a function of the ratio of any two or more residuals. Most preferably, each sensor validity index is calculated at block 118 as a function of the ratio of the residual $E_i$ of equation (15) over the residual A of equation (11) or as a ratio of the residual $D_i$ of equation (14) over the residual A of equation (11) as:

$$\eta_i = \frac{E_i}{A} = 1 - (1 - c_{ii})\frac{D_i}{A} \quad (16)$$

More particularly, the sensor validity index $\eta_i$ for the sensor $S_i$ can be calculated as:

$$\eta_i = 1 - \frac{(1 - c_{ii})(x_i - \hat{x}_i)^2}{\sum_{h=1}^{n}(1 - c_{hh})^2(x_h - \hat{x}_h)^2} \quad (17)$$

The sensor validity index of a sensor which has actually failed will, over a number of time periods, decrease toward zero while the sensor validity indexes of non-faulty sensors will remain closer to one. Generally, the method of FIG. 5 identifies a particular sensor as a failed sensor if the sensor validity index associated with that sensor falls below a predetermined value, such as 0.5, although any other desired predetermined value can be used instead.

If desired, a block 120 filters the sensor validity index $\eta$ for each sensor to reduce noise within the sensor validity index. Generally, the sensor validity index for any sensor can be filtered using an iterative technique and can be calculated as:

$$\bar{\eta}_k = (1-\lambda)\bar{\eta}_{k-1} + \lambda\eta_k \quad (18)$$

wherein: $\eta_k$=the sensor validity index; associated with a particular sensor at the time period k;

$\bar{\eta}_k$=the filtered sensor validity index associated with a particular sensor at the time period k;

$\bar{\eta}_{k-1}$=the filtered sensor validity index associated with a particular sensor at the time period k-1; and $\lambda$=the filtering index or forgetting factor.

It is preferable to set the initial filtering index as:

$$\lambda = 1/n_w \quad (19)$$

wherein: $n_w$=the number of time periods within the filter window;

and to set the initial value of the filtered validity index $\bar{\eta}_1$ as:

$$\bar{\eta}_1 = 1 - \frac{1}{n-1} \quad (20)$$

With these initial conditions, it takes $n_w$ time periods to eliminate the effects of the initial conditions from the filtered sensor validity index $\bar{\eta}_k$.

If desired, adaptive filtering can be applied to the sensor validity index for any or all of the sensors $S_1$-$S_n$. An adaptive filtering technique can be accomplished by changing the filtering index $\lambda$ as:

$$\lambda^{new} = \lambda^{old} \alpha \Delta I_{fa} \quad (21)$$

wherein: $\lambda^{new}$=the new filtering index or forgetting factor;

$\lambda^{old}$=the old filtering index or forgetting factor;

$\alpha$=the learning coefficient associated with adaptive filtering when using the false alarm rate $I_{fa}$; and $\Delta I_{fa}$=the rate of change of the false alarm rate;

or as:

$$\lambda^{new} = \lambda^{old} + \beta \Delta I_{ma} \quad (22)$$

wherein: $\lambda^{new}$=the new filtering index or forgetting factor;

$\lambda^{old}$=the old filtering index or forgetting factor;

$\beta$=the learning coefficient associated with adaptive filtering when using the missing alarm rate $I_{ma}$; and $\Delta I_{ma}$=the rate of change of the missing alarm rate.

In equations (21) and (22), the learning coefficients $\alpha$ and $\beta$ can be determined or set according to any desired method including being determined manually by an operator. The change in the false alarm rate $\Delta I_{fa}$ and the change in the missing alarm rate $\Delta I_{ma}$ may be determined by an operator using a counter or other device which keeps track of the number of false alarms $I_{fa}$ and/or the number of missing alarms $I_{ma}$ generated by the method, along with the time period in which these false alarms and/or missing alarms occurred and the rate of change of these values over any predetermined amount of time.

After the blocks 116-122 calculate the sensor validity indexes $\eta_1$-$\eta_n$ associated with the sensors $S_1$-$S_n$, respectively, for a particular time period, a bl 124 detects whether and which one of the sensors has failed using the sensor validity indexes $\eta_1$-$\eta_n$. The block 124 may determine which sensor has failed from the sensor validity indexes by determining if any of the sensor validity indexes have fallen below a predetermined value and, if so, by identifying the associated sensor as a failed sensor. When it has already been determined that one of the sensors has failed by, for example, the block 114, the sensor validity indexes may also or alternatively be compared with each other to determine which of the sensors $S_1$-$S_n$ has failed.

When it has been determined that a fault has occurred and when none of the sensor validity indexes is below a predetermined value or is significantly lower than the other sensor validity indexes or if none of the sensor validity indexes meet any other desired fault detection or identification criteria, the identification of the faulty sensor is indeterminate and the sensor fault status can not be determined until a later time period. Such an indeterminate situation usually occurs for a number of time periods after the presence of a faulty sensor is detected by the block 114 using a residual. Generally, the higher degree of filtering that is applied to a sensor validity index, the longer it takes to identify which sensor has failed after the presence of a faulty sensor is detected using a residual. If desired, the sensor validity indexes could be used to both detect the presence of a faulty sensor and identify which sensor is faulty. In such a case, the block 114 could be eliminated from the method of FIG. 5.

If the blocks 114 and/or 124 do not detect that one of the sensors has failed, control is returned to the block 104. If, however, one of the blocks 114 or 124 detects that one of the sensors has failed, the block 126 notifies the operator of the failure and, if possible, notifies the operator of the particular sensor which has failed. This notification enables the operator to repair or replace the faulty sensor.

A block 128 then generates a control signal which controls the multiplexer 28 of FIG. 4 to replace the sensor output signal $x_f$ of the failed sensor $S_f$ with the sensor estimate signal $\hat{x}_f$ calculated for that sensor by the block 108. If desired, once a faulty sensor is detected, the block 128 can automatically substitute the calculated sensor estimate signal $\hat{x}_f$ for the sensor output signal $x_f$ of the faulty sensor $S_f$ until the faulty sensor $S_f$ has been repaired or replaced. The block 128 then returns control to the block 104 which samples the sensor measurements for the next time period. The loop comprising the blocks 104-128 is continuously repeated during operation of the process 12.

The signal replacement process performed by the block 128 helps to preserve the integrity of the control signals produced by the controller 14 (FIG. 3) during control of the process 12 because these control signals will be based on sensor estimates instead of faulty sensor measurements when a sensor has failed. This replacement technique, in conjunction with subsequent calculations by the loop comprising the blocks 104-128, may enable determination of further faults of other sensors if such faults occur before the detected and identified faulty sensor is repaired or replaced.

Figure 6:
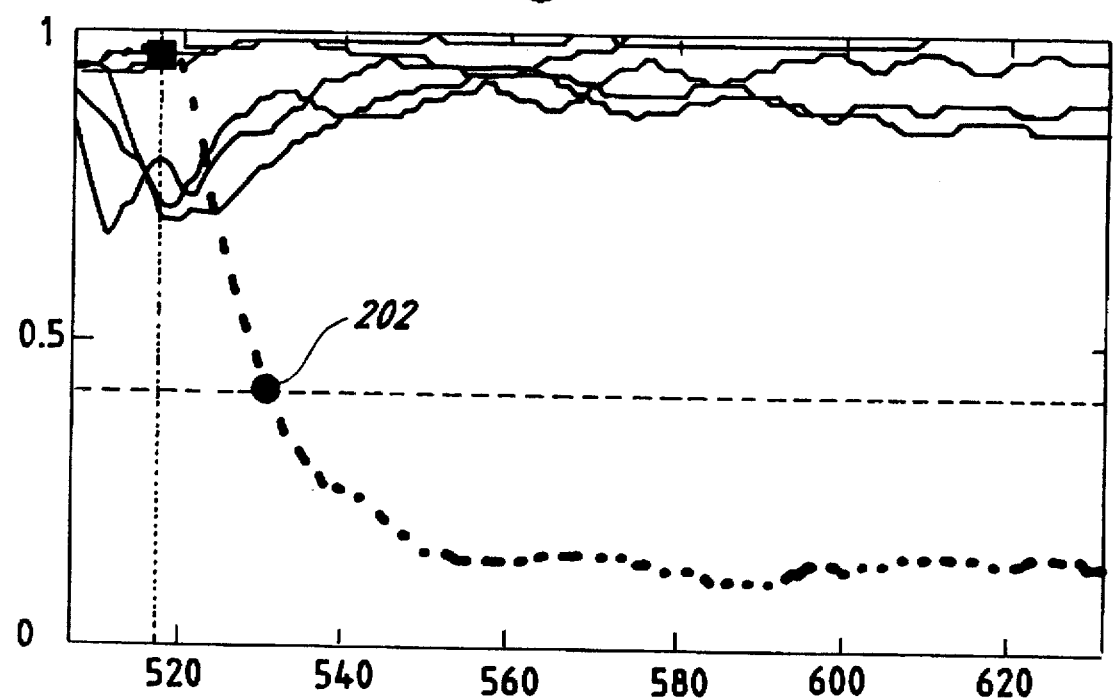
FIG. 6 comprises a graph of the sensor validity index for each of a set of six sensors of a process control system.
Figure 7:
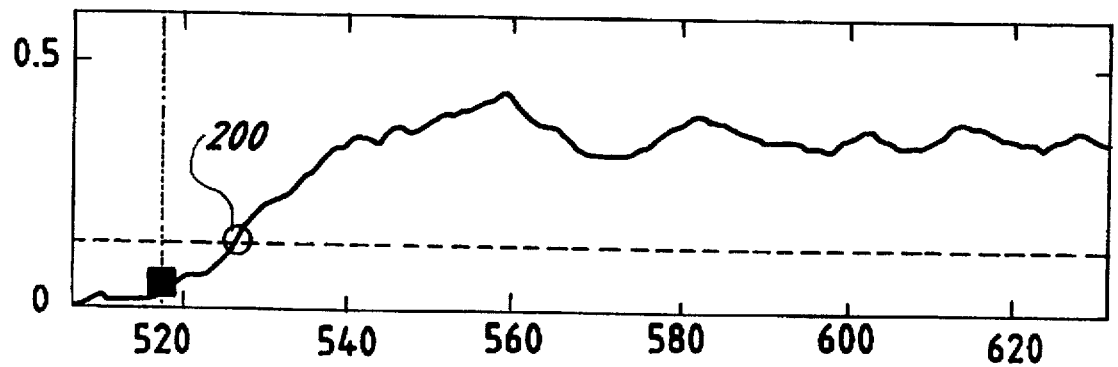
FIG. 7 comprises a graph illustrating a residual calculated for the process control system associated with FIG. 6.

FIG. 6 comprises a graph of the sensor validity index for a group of six process sensors, as calculated by a system using the method of the present invention, between time periods 510 and 630. FIG. 7 comprises a graph of the residual A for the same six sensors and time periods. The vertical dotted lines of FIGS. 6 and 7 indicate the time period at which one of the sensors (indicated in FIG. 6. by a dashed line) failed. The point 200 of FIG. 7 illustrates the time period at which the system operating according to the method of the present invention detected that one of the sensors had failed based on the comparison of the residual A with a set point. The point 202 of FIG. 6. indicates the time period at which the same system identified the particular sensor which had failed based on a comparison of the calculated sensor validity indexes with a set point. It can be noted from FIG. 6 that a failure of one of the sensors actually drives the sensor validity indexes of the non-failed sensors closer to one.

It is preferable to use a residual, such as one or more of the residuals A, $B_i$, $C_i$, $D_i$ and/or $E_i$ given above, to monitor for a sensor fault and, when a faulty sensor is detected based on this residual, to use the calculated validity indexes for each of the sensors to identify which of the sensors has failed. Using such a faulty sensor detecting and identifying methodology provides for better fault detection because the residuals are less susceptible to noise and sporadic oscillations than the sensor validity indexes and, thus, the residuals present a more stable output signal upon which to base detection of a sensor fault. The sensor validity indexes actually tend to vary to a greater extent during normal operation, i.e, they have a greater standard of deviation around a normal value than the residuals. As a result, using the sensor validity indexes to determine whether a fault in one of the sensors has occurred in the first place is more likely to generate false alarms than merely using the residuals to determine whether one of the sensors has failed. This two-tiered detecting and identifying scheme can also save on processing because it requires fewer calculations as this scheme makes it unnecessary to calculate the sensor validity indexes for each of the sensors at each time period. In fact, this method allows the sensor validity indexes to be calculated only when the system detects that one of the sensors has failed, at which time the sensor validity indexes are needed to identify which of the sensors has failed.

Figure 8:
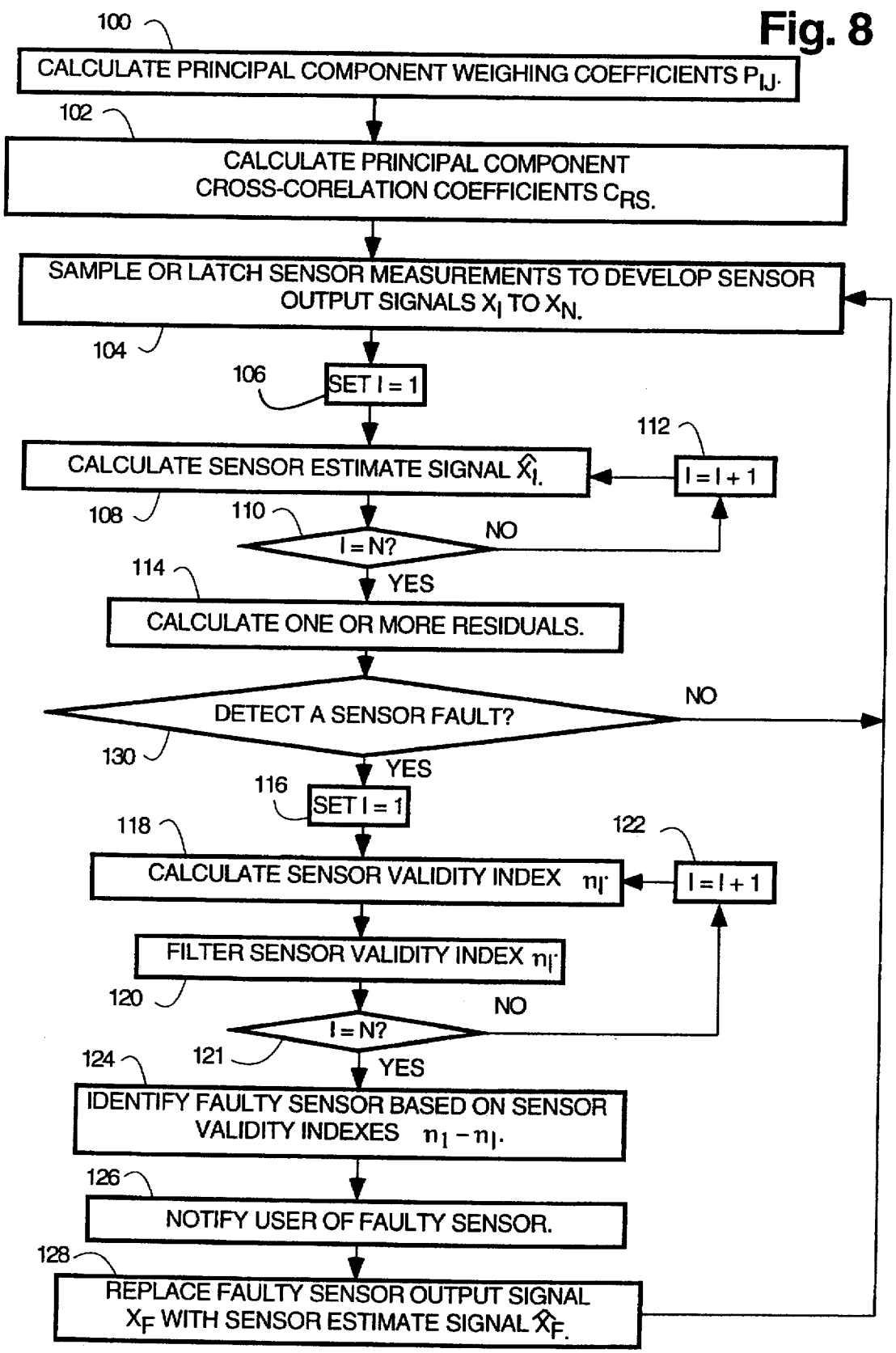
FIG. 8 comprises a flow chart illustrating a further method of detecting and identifying faulty sensors in accordance with the present invention.

The flow chart of FIG. 8 illustrates a further embodiment of a method of detecting and identifying faulty sensors according to the present invention, which can also be implemented by the sensor analyzer 26 of FIG. 4. Blocks of FIG. 8 which perform essentially the same function as blocks of FIG. 5 have been numbered identically. The method of FIG. 8 is similar to the method of FIG. 5 except that the one or more of the residuals calculated by the block 114 are used by a block 130 to detect whether a sensor fault has occurred and, if no sensor fault has occurred, control immediately returns to the block 104 for the next time period. However, if the block 130 detects a sensor fault based on a residual calculated by the block 114, control is switched to the blocks 116–122 which calculate the sensor validity index for each sensor. As indicated above, the block 120 can apply filtering to the sensor validity indexes calculated by the block 118. If filtering is to be applied, however, it may be preferable to perform the steps of blocks 116–122 even when the block 130 determines that none of the sensors has failed.

Next, the block 124 determines which sensor has failed based on the sensor validity indexes $\eta_1$-$\eta_n$. When the faulty sensor has been identified by the block 124, the block 126 sounds an alarm or gives an operator an indication of which sensor has failed. The block 128 then replaces the output of the failed sensor with the sensor estimate signal associated with the failed sensor, as calculated by the block 108. After the block 128 has performed this replacement procedure or it has been determined that the faulty sensor cannot be identified yet, control is returned to the block 104 for further processing.

Although the above described method is particularly suited for use with linear processes, it may also be used, or may be modified according to known techniques to be used, with non-linear processes as well.

Any of the methods of FIGS. 5 and/or 8 or otherwise described herein may be embodied in hardware or may be implemented in an appropriately programmed digital computer or processor which is programmed with software either as separate programs, or as modules of a common program. Furthermore, while the present invention has been described with reference to specific examples which are intended to be illustrative and not delimiting of the invention, it will be apparent to those of ordinary skill in this art that changes, additions and/or deletions may be made to the disclosed embodiments without departing from the spirit or scope of the invention.

We claim:

1. A method of detecting a faulty sensor within a process control system having a set of sensors each of which produces an associated sensor output signal, the method comprising the steps of:

producing a set of sensor estimate signals from a combination of a plurality of the sensor output signals wherein each sensor estimate signal comprises an estimate of the output of a different one of the sensors;

determining a validity index for one of the set of sensors as a function of a residual indicative of a measure of the difference between the sensor estimate signals and the sensor output signals; and using the validity index associated with the one of the sensors to ascertain if the one of the sensors has failed.

2. The method of claim 1, wherein the step of determining the validity index further comprises the step of determining the validity index as a function of a further residual indicative of another measure of the difference between the sensor estimate signals and the sensor output signals.

3. The method of claim 2, wherein the step of determining the validity index comprises the step of determining the validity index as a function of a ratio of the residual and the further residual.

4. The method of claim 3, wherein the step of determining the validity index comprises the step of using a residual, the value of which is a measure of the sum of the squared differences between the sensor estimate signals and the sensor output signals, to determine the validity index.

5. The method of claim 3, wherein the step of determining the validity index comprises the step of using a further residual, the value of which is dependent upon the sensor for which the validity index is being determined, to determine the validity index.

6. The method of claim 3, wherein the step of producing the set of sensor estimate signals includes the step of using a set of weighting coefficients developed for the process control system to produce the sensor estimate signals and the step of determining the validity index comprises the step of using a further residual, the value of which is dependent upon an element of a cross-correlation matrix associated with the set of weighting coefficients, to determine the validity index.

7. The method of claim 3, wherein the step of producing the set of sensor estimate signals includes the step of using a set of weighting coefficients developed for the process control system to calculate the sensor estimate signals and the step of determining the validity index comprises the step of calculating a validity index $\eta_i$ for an ith sensor $S_i$ as:

$$\eta_i = 1 - \frac{(1-c_{ii})(x_i-\hat{x}_i)^2}{\sum_{h=1}^{n}(1-c_{hh})^2(x_h-\hat{x}_h)^2} \quad (17)$$

wherein: $x_i$=the sensor output signal of the ith sensor;

$\hat{x}_i$=the sensor estimate signal associated with the ith sensor;

n=the number of sensors; and $c_{ii}$ & $c_{hh}$=cross-correlation coefficients developed from the set of weighting coefficients.

8. The method of claim 1, wherein the step of producing the set of sensor estimate signals includes the step of using a set of weighting coefficients developed by a principal component analysis to produce the set of sensor estimate signals.

9. The method of claim 8, wherein the step of producing the set of sensor estimate signals includes the step of calculating an asymptotic value of a sensor estimate signal for one of the set of sensors.

10. The method of claim 8, wherein the step of producing the set of sensor estimate signals includes the step of calculating the asymptotic value of a sensor estimate signal $\hat{x}_i$ for a sensor $S_i$ which would be developed by an iterative routine that recalculates the value of the sensor estimate signal $\hat{x}_i$ during each iteration using principal component analysis wherein, in each iteration, an input of the iterative routine is replaced with the sensor estimate signal $\hat{x}_i$ calculated in a previous iteration.

11. The method of claim 8, wherein the step of determining the validity index comprises the step of using a residual, the value of which is a function of an element of a cross-correlation matrix associated with the set of weighting coefficients, to determine the validity index.

12. The method of claim 8, wherein the step of producing the set of sensor estimate signals includes the step of using a set of weighting coefficients developed by a non-linear principal component analysis to produce the set of sensor estimate signals.

13. The method of claim 1, wherein the step of determining the validity index comprises the step of using a residual, the value of which is a function of the difference between the sensor estimate signals and the sensor output signals with one of the sensor output signals replaced by one of the sensor estimate signals, to determine the validity index.

14. The method of claim 1, further comprising the step of filtering the validity index.

15. The method of claim 14, wherein the step of filtering the validity index comprises the step of filtering the validity index using an iterative routine.

16. The method of claim 14, wherein the step of filtering the validity index comprises the step of filtering the validity index in an adaptive manner.

17. The method of claim 1, further including the step of notifying an operator that the one of the sensors has failed when the one of the sensors has been ascertained to have failed.

18. The method of claim 1, wherein the process control system controls a process in accordance with the sensor output signals and further including the step of replacing the sensor output signal of a sensor which has been ascertained to have failed with the sensor estimate signal associated with the sensor which has been ascertained to have failed before the process control system uses the sensor output signal of the sensor which has been ascertained to have failed in controlling the process.

19. A method of identifying a faulty sensor in a process having multiple sensors each of which produces an associated sensor output signal comprising the steps of:

using a correlation analysis to determine a set of sensor estimate signals from a combination of a plurality of the sensor output signals;

calculating a residual indicative of a difference between the sensor output signals and the set of sensor estimate signals;

determining if one of the sensors has failed from the residual;

calculating a validity index as a function of the residual for each of the sensors when one of the sensors has been determined to have failed; and identifying the particular sensor which has failed from the calculated validity indexes.

20. The method of claim 19, wherein the step of calculating the validity index comprises the step of determining the validity index as a function of a further residual which is indicative of another difference between the set of sensor estimate signals and the sensor output signals.

21. The method of claim 20, wherein the step of determining the validity index comprises the step of determining the validity index as a function of the ratio of the residual and the further residual.

22. The method of claim 21, wherein the step of determining the validity index comprises the step of using a further residual, the value of which is a function of the sensor for which the validity index is being determined, to determine the validity index.

23. The method of claim 19, wherein the step of producing the set of sensor estimate signals includes the step of calculating the asymptotic value of a sensor estimate signal $\hat{x}_i$ for a sensor $S_i$ which would be developed by an iterative routine that recalculates the value of the sensor estimate signal $\hat{x}_i$ during each iteration using principal component analysis wherein, in each iteration, an input of the iterative routine is replaced with the sensor estimate signal $\hat{x}_i$ calculated in a previous iteration.

24. An apparatus which detects a faulty sensor within a process control system having a set of sensors each of which produces an associated sensor output signal, the apparatus comprising:

means for producing a set of sensor estimate signals from a combination of a plurality of the sensor output signals wherein each sensor estimate signal comprises an estimate of the output of a different one of the sensors;

means for determining a validity index for one of the set of sensors as a function of a residual which is indicative of a difference between the sensor estimate signals and the sensor output signals; and means for ascertaining if the one of the set of sensors has failed from the determined validity index.

25. The apparatus of claim 24, wherein the determining means includes means for calculating the validity index as a function of a further residual which is indicative of another difference between the sensor estimate signals and the sensor output signals.

26. The apparatus of claim 25, wherein the calculating means calculates the validity index as a function of a ratio of the residual and the further residual.

27. The apparatus of claim 25, wherein the calculating means calculates the validity index as a function of the further residual, wherein the further residual has a value which is dependent upon the sensor for which the validity index is being determined.

28. The apparatus of claim 25, wherein the producing means uses a set of weighting coefficients developed for the process control system to calculate the sensor estimate signals and the calculating means calculates the validity index as a function of the further residual, wherein the further residual has a value which is dependent upon a cross-correlation coefficient associated with the set of weighting coefficients.

29. The apparatus of claim 24, wherein the producing means produces the set of sensor estimate signals using a set of weighting coefficients developed by a principal component analysis and includes means for calculating an asymptotic value of a sensor estimate signal $\hat{x}_i$ for the ith sensor $S_i$ which would be developed by an iterative routine that recalculates the value of the sensor estimate signal $\hat{x}_i$ during each iteration using principal component analysis wherein, in each iteration, an input of the iterative routine is replaced with the sensor estimate signal $\hat{x}_i$ calculated in a previous iteration.

30. The apparatus of claim 24, wherein the producing means uses a set of weighting coefficients developed for the process control system to produce the sensor estimate signals and the determining means includes means for calculating a validity index $\eta_i$ for an ith sensor $S_i$ as:

$$\eta_i = 1 - \frac{(1-c_{ii})(x_i - \hat{x}_i)^2}{\sum_{k=1}^{n} (1-c_{kk})^2(x_k - \hat{x}_k)^2} \tag{17}$$

wherein: $x_i$=the sensor output signal of the ith sensor;

$\hat{x}_i$=the sensor estimate signal associated with the ith sensor;

n=the number of sensors; and $c_{ii}$ & $c_{hh}$=cross-correlation coefficients developed from the set of weighting coefficients.

31. The apparatus of claim 24, further comprising means for filtering the validity index.

32. The apparatus of claim 31, wherein the filtering means comprises means for iteratively filtering the validity index.

33. The apparatus of claim 31, wherein the filtering means comprises means for adaptively filtering the validity index.

34. The apparatus of claim 24, further including means for notifying an operator of the identity of the sensor which has failed when the ascertaining means ascertains that the one of the sensors has failed.

35. The apparatus of claim 24, wherein the process control system controls a process in accordance with the sensor output signals and further including means for replacing the sensor output signal of a sensor which has been ascertained to have failed with the sensor estimate signal associated with the sensor which has been ascertained to have failed before the process control system uses the sensor output signal of the sensor which has been ascertained to have failed in controlling the process.

36. An apparatus for identifying a faulty sensor in a process having multiple sensors each of which produces an associated sensor output signal comprising:

means for implementing a correlation analysis to determine a set of sensor estimate signals from a combination of a plurality of the sensor output signals;

means for calculating a residual indicative of a difference between the sensor output signals and the set of sensor estimate signals;

means for determining if one of the sensors has failed from the residual;

means for developing a validity index as a function of the residual for each of the sensors when one of the sensors has been determined to have failed; and means for identifying a particular sensor which has failed from the calculated validity indexes.

37. The apparatus of claim 36, wherein the developing means develops the validity index for a sensor as a function of the residual and a further residual which is indicative of another difference between the sensor estimate signals and the sensor output signals.

38. The apparatus of claim 37, wherein the developing means develops the validity index for a sensor as a function of the ratio of the residual and the further residual.

39. The apparatus of claim 36, wherein the process control system controls a process in accordance with the sensor output signals and further including means for replacing the sensor output signal of the particular sensor which has been identified to have failed by the identifying means with the sensor estimate signal associated with the particular sensor which has been identified to have failed before the process control system uses the sensor output signal of the particular sensor which has been identified to have failed in controlling the process.

40. The apparatus of claim 39, further including means for notifying an operator of the identity of the particular sensor which has been identified to have failed by the identifying means.

* * * * *